United States Patent [19]

Karol

[11] 4,015,059
[45] Mar. 29, 1977

[54] FUSED RING CATALYST AND ETHYLENE POLYMERIZATION PROCESS THEREWITH

[75] Inventor: Fredrick John Karol, Bellemead, N.J.

[73] Assignee: Union Carbide Corporation, New York, N.Y.

[22] Filed: Dec. 29, 1975

[21] Appl. No.: 644,814

[52] U.S. Cl. .............................. 526/130; 252/430; 252/431 R; 526/154; 526/170; 526/348; 526/352

[51] Int. Cl.$^2$ .................... C08F 4/02; C08F 10/02

[58] Field of Search .................. 252/430, 431 R; 526/130, 154, 160, 170

[56] References Cited

UNITED STATES PATENTS 3,806,500   4/1974   Karol ................................ 526/130

OTHER PUBLICATIONS

F.J. Karol et al., Journal of Polymer Science, Part A1, vol. 10, pp. 2621–2637 (1972).
F.J. Karol et al., Journal of Polymer Sciences, Polymer Chemistry Edition, vol. 12, pp. 1549–1558 (1974).

*Primary Examiner*—Edward J. Smith
*Attorney, Agent, or Firm*—James J. O'Connell

[57] ABSTRACT

Bis(indenyl)- and bis(fluorenyl)-chromium [II] compounds are deposited on activated inorganic oxide supports to provide catalysts which are useful in the presence of hydrogen, alone, or with cyclopentadiene compounds, for the polymerization of ethylene in high yields. These catalysts exhibit good thermal stability and show a unique response to cyclopentadiene compounds which allows production of polymers having a relatively broad range of melt index values.

23 Claims, No Drawings

FUSED RING CATALYST AND ETHYLENE POLYMERIZATION PROCESS THEREWITH

BACKGROUND OF THE INVENTION

1. Field of the Invention

The invention relates to the catalytic polymerization of ethylene, alone, or with other α-olefin monomers.

2. Description of the Prior Art

U.S. Pat. No. 3,709,853 discloses the use of an inorganic oxide supported bis-cyclopentadienyl chromium [II] compound as a catalyst for the polymerization of ethylene alone, or with other α-olefins.

The polymerization activity of these catalysts, however, tends to drop off rapidly after the catalysts have been in use for one to two hours. The ethylene polymers made with this catalyst, moreover, tend to be of very high molecular weight, i.e., having relatively very low melt index values, unless the catalyst is used with hydrogen. The catalyst's response to hydrogen, however, as a melt index regulator, is very high, making it difficult to readily control the melt index properties of the polymer under large scale commercial polymerization procedures.

SUMMARY OF THE INVENTION

It has now been found that ethylene, alone, or with other α-olefins, can be polymerized to provide, high yields of polymers having relatively low catalyst residue contents and a relatively broad range of melt index properties, which properties are relatively easy to control, by using thermally-stable catalysts formed by depositing bis(indenyl- and bis(fluorenyl)-Cr compounds on certain inorganic oxide supports. The yields of polymer which are available by the use of these catalysts can be of the order of about ≥ 10,000 pounds of polymer per pound of chromium metal in the supported catalyst. The catalysts are used in the presence of, as a melt index regulator, hydrogen, alone, or with certain cyclopentadiene compounds.

An object of the present invention is to provide a more thermally stable catalyst with which ethylene polymers having a relatively broad range of melt index values can be readily prepared in high yields over a relatively long reaction period.

A further object of the present invention is to provide ethylene polymerization catalysts which have a sufficient response to readily useable melt index regulators as to allow for the facile preparation of ethylene polymers having a relatively broad range of melt index values.

A further object of the present invention is to provide such catalysts which provide additional process flexibility by exhibiting an optimum polymerization temperature different from the catalysts disclosed in U.S. Pat. No. 3,709,853.

DESCRIPTION OF THE PREFERRED EMBODIMENT

In accordance with the teachings of the present invention the desired ethylene polymerization catalyst is prepared by depositing selected fused ring organochromium compounds on selected inorganic oxide supports.

INORGANIC OXIDE SUPPORTED ORGANOCHROMIUM COMPOUND

The catalyst species comprises selected fused ring organochromium compounds deposited on certain inorganic oxide supports.

About 0.001 to 25% or more, by weight of the organometallic compound is used on the support, based on the combined weight of the organometallic compound and the inorganic oxide support. The amount of the organometallic compound which can be deposited on the support varies, depending on the particular support being used, and the activation or dehydration temperature of such support. Typically about one fourth to one half of the amount of the organometallic compound that could be deposited on the support is used to facilitate introducing the compound into the reactors, but extremes in amounts of from near zero to total saturation of the support can be used without adverse effect on final polymer properties.

The fused ring organochromium compounds which are employed in the present invention have the structure Ar-CrII-Ar' wherein Ar and Ar' are the same or different and are indenyl radicals of the structure

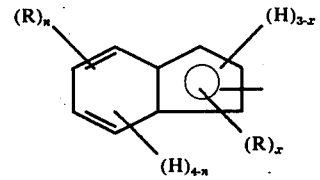

wherein the Rs are the same or different $C_1$ to $C_{10}$, inclusive, hydrocarbon radicals, and $n$ is an integer of 0 to 4, inclusive and $x$ is 0, 1, 2 or 3, and fluorenyl radicals of the structure

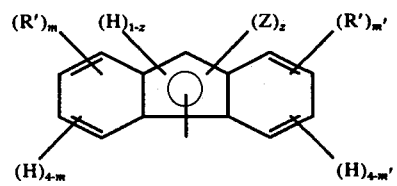

wherein the R's may be the same or different $C_1$ to $C_{10}$, inclusive, hydrocarbon radicals, and $m$ and $m'$ may be the same or different integers of 0 to 4, inclusive, and Z is H or R', and $z$ is 0 or 1. The R and R' hydrocarbon radicals may be saturated or unsaturated, and they may include aliphatic, alicyclic and aromatic radicals such as methyl, ethyl, propyl, butyl, pentyl, cyclopentyl, cyclohexyl, allyl, phenyl and naphthyl radicals.

The fused ring organochromium compounds which may be used on the inorganic oxide supports in accordance with the present invention may be prepared as disclosed in Advances in Organometallic Chemistry by J. M. Birmingham, F.G.A. Stone and R. West, Eds., Academic Press, New York, 1964, pages 377–380, which disclosure is incorporated herein by reference.

The inorganic oxide materials which may be used as a support for the organometallic compounds are materials having a high surface area, that is, a surface area in the range of about 50 to about 1000 square meters per gram. The inorganic oxides which may be used include silica, alumina and silica-alumina.

Because the organometallic compounds are sensitive to moisture, the catalyst support should be completely dried before it is brought into contact with the organochromium compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the absorbed water from the support while at the same time avoiding such heating as will remove all of the chemically bound water from the support. The passage of a stream of dry inert gas through the support during the drying aids in the displacement of the water from the support. Drying temperature of from about 200° C to 1000° C. for a short period of about four hours or so should be sufficient if a well dried inert gas is used, and the temperature is not permitted to get so high as to completely remove the chemically bound hydroxyl groups on the surface of the support.

Any grade of support can be used but intermediate density (ID) silica having a surface area of about 300 square meters per gram and a pore diameter of about 160 to 200 A is preferred. Other grades such as the G-951 silica, as so designated by W. R. Grace and Co., having a surface area of 600 square meters per gram and a pore diameter of 65 A is also quite satisfactory. The supports may have a pore volume ($N_2$) of about 1.0 to 2.5, or more, cc/gm. Variations in melt index control and in polymer productivity can be expected between different grades of typoes of supports.

The supported catalysts can be prepared by a slurry technique where the selected and properly dried support is added under conditions which exclude the presence of air and moisture to a solution containing the organochromium compound and solvent to form a slurry. The slurry may be stirred for a period of up to about 4 hours to obtain good adsorption of the organochromium compound on the support.

The supported catalyst can be used in slurry form or as a semi-solid paste or as a dry free flowing powder. To form the paste or dry powder, the solvent can be filtered, drained or evaporated from the slurry under conditions which exclude oxygen and moisture to yield the desired form of the catalyst.

The dry supported catalyst may also be conveniently prepared in the absence of solvent by direct vapor deposition (sublimation) of the selected organochromium compound onto a dry support. This may be simply and conveniently accomplished by blending the organochromium compound and support under a dry, inert atmosphere, and then reducing the pressure to cause the organochromium compound to sublime and adsorb onto the support.

Care should be taken to avoid having moisture or air, which are catalyst poisons, contact the supported catalyst.

About 0.1 to 0.00001 weight % of the supported catalyst is used per mole of monomer being polymerized. The amount of catalyst being employed may vary depending on the type of polymerization procedure being employed and the amount of catalyst poisons in the system.

THE MONOMERS

Ethylene may be polymerized alone, in accordance with the present invention, or it may be interpolymerized with one or more other alpha-olefins containing 3 to about 12, inclusive, carbon atoms. The other $\alpha$-olefins monomers may be mono-olefins or non-conjugated di-olefins.

The mono-$\alpha$-olefins which may be interpolymerized with ethylene would include propylene, butene-1, pentene-1, 3-methylbutene-1, hexene-1, 4-methyl-pentene-1, 3-ethylbutene-1, heptene-1, octene-1, decene-1, 4,4-dimethylpentene-1, 4,4-diethyl hexene-1, 3,4-dimethylhexene-1, 4-butyl-1-octene, 5-ethyl-1 decene, 3,3-dimethylbutene-1, and the like. Among the diolefins which may be used are 1,5-hexadiene, dicyclopentadiene, ethylidene norbornene, and other non-conjugated diolefins.

THE POLYMERS

The polymers which are prepared in accordance with the teachings of the present invention are solid materials which have densities of about 0.945 to 0.970, inclusive, and melt indexes of about 0.1 to 100 or more.

The preferred polymers are the homopolymers of ethylene. The interpolymers will contain at least 50 weight %, and preferably at least 80 weight %, of ethylene.

THE POLYMERIZATION REACTION

After the catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular catalyst being used and its concentration. The selected operating temperature is also dependent upon the desired polymer melt index since such temperature is also a factor in adjusting the molecular weight of the polymer. Preferably, the temperature is from about 30° C. to about 100° C. in the conventional slurry or "particle forming" process which is conducted in an inert organic solvent medium. As with most catalyst systems, the use of higher polymerization temperatures tends to produce lower weight average molecular weight polymers, and consequently polymers of higher melt index.

The pressure can be any pressure sufficient to initiate the polymerization of the monomer charge and can be from subatmospheric pressure, using an inert gas as a diluent, to superatmospheric pressure of up to about 1,000,000 psig (pounds per square inch gauge), or more, but the preferred pressure is from atmospheric up to about 1000 psig. As a general rule, a pressure of 20 to 800 psig is preferred.

When an inert organic solvent medium is employed in the process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, isopentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature for the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., whereas in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperature, the monomer is more soluble in the solvent medium, this counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than fifty per cent solids content, provided conditions of sufficient agitation are maintained. It is particularly preferable to operate the slurry process in the range of 30–40 weight percent of polymer solids.

Recovery of the polymer from the solvent medium is, in this embodiment, reduced to a simple filtration and/or drying operation and no efforts need be expended in polymer clean up and catalyst separation or purification. The residual concentration of catalyst in the polymer is so small it can be left in the polymer.

When the solvent serves as the principal reaction medium it is, of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

By conducting the polymerization reaction in the presence of hydrogen, which appears to function as a chain transfer agent, the molecular weight of the polymer may be further controlled.

Experience has shown that hydrogen may be used in the polymerization reaction in amounts varying between about 0.001 to about 10 moles of hydrogen per mole of olefin monomer.

More flexibility may be obtained in the range of the melt index values of the polymers that are prepared with the catalyst of the present invention, if the catalyst is used in the presence of a cyclopentadiene compound, as well as in the presence of hydrogen. The cyclopentadiene compound to be employed in this regard is one having the structure

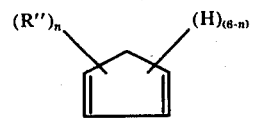

wherein $n$ is 0 to 6, and preferably 0 to 1 and $R''$ is a $C_1$ to $C_{10}$ hydrocarbon radical. The $R''$ hydrocarbon radical may be saturated or unsaturated, and they may include aliphatic, alicyclic and aromatic radicals such as methyl, ethyl, propyl, butyl, pentyl, cyclopentyl, cyclohexyl, allyl, phenyl and naphthyl radicals.

About 0.05 to 10 and preferably about 0.25 to 1.0 mols of the cyclopentadiene compound is used per mol of the fused ring compound that is employed in the catalyst composition of the present invention. Although the hydrogen is normally only brought into contact with the catalyst composition in the polymerization reaction vessel, the cyclopentadiene compound may be added to, or reacted with the catalyst composition prior to, of after, the feeding of the catalyst to the reaction vessel. It is believed that the cyclopentadiene compound, when brought into contact with, or used to treat, the inorganic oxide supported fused ring compounds, displaces, with cyclopentadienyl ligands, some of the hydrocarbon radical ligands which are present in the supported fused ring compound based compositions of the present invention. The cyclopentadiene compound can be added to the catalyst systems of the present invention before, concurrent with, or after, the addition of the fused ring compound to the activated inorganic oxide support.

The homo- or inter- polymerization of ethylene with the catalysts of this invention can also be accomplished in a fluid bed reaction process. An example of a fluid bed reactor and process which can be used for this purpose is disclosed in United Kingdom Pat. No. 1,253,063, which disclosure is incorporated herein by reference.

The following examples are designed to illustrate the present invention and are not intended as a limitation upon the scope thereof.

The analytical method used for determining unsaturation in the polymers produced in the examples disclosed below consisted of determining the optical density of the appropriate infrared bands and using the following equations:

$$\% \text{ vinyl unsaturation} = \frac{(A_{11.02})(7.8)}{t(\text{mils})}$$

$$\% \text{ trans unsaturation} = \frac{(A_{10.40\mu})(11.1)}{t(\text{mils})}$$

$$\% \text{ pendant methylene group} = \frac{(A_{11.27})(9.13)}{t(\text{mils})}$$

where:
A = absorbance
t = thickness, in mils, of a sample of polymer in film form vinyl groups/1000 C atoms in polymer = % vinyl × 5.19 trans unsaturation/1000 C atoms in polymer = % trans × 5.39 pendant methylene groups/1000 C atoms in polymer = % pendant methylene × 5.39

Density is determined by ASTM D-1505, with the test plaque being conditioned for one hour at 120° C. to allow it to approach equilibrium crystallinity.

Melt Index (MI) is determined by ASTM D-1238, with the polymer measured at 190° C., and the test values reported as decigrams per minute.

Flow Index (HLMI) is determined by ASTM D-1238 with the measurements taken while the polymer is subjected to a weight which is 10 times that used in the Melt Index test.

$$\text{Flow Rate Ratio } (FRR) = \frac{\text{Flow Index}}{\text{Melt Index}}$$

EXAMPLES 1 to 7

A. Preparation of Catalyst

Seven catalysts were prepared. Each catalyst was prepared by depositing 18 or 22 milligrams of bis(indenyl)chromium II on 0.4 grams of an activated silica support. The organochromium compound was deposited on the support by adding the support to 100 ml. of hexane, and then adding organochromium to the system and then stirring the system at room temperature for about 30 to 60 minutes. The support had a surface area of about 300 square meters per gram and had been activated by being heated at 600° or 800° C. for ≥ 18 hours. The amount of bis(indenyl)chromium II, and the activation temperature of the support, used for each catalyst is disclosed below in Table I.

B. Activity Studies in Ethylene Polymerization

Each of the catalysts prepared above was used to homo-polymerize ethylene for 1.0 to 2.5 hours at a temperature of ≥ 90° C. and at a pressure of ≥ 170 psig. The pressure was supplied by the ethylene feed, supplemented, in some cases, by a feed of hydrogen. The polymerization reactions were conducted under slurry polymerization conditions in 500 ml of n-hexane. Table I below also lists the psig of H₂ (if any); the psig of ethylene; the polymerization time, in minutes; and the polymerization temperature, in ° C. which were employed in each polymerization reaction. Table I also lists, with respect to the resulting polymers, the yield, in grams; the melt index (MI), in decigrams per minutes; the high load melt (HLMI), in decigrams per minute; the melt flow ratio (FRR); and the weight % of extractables (18 hours in boiling cyclohexane) and the density, in grams per cubic centimeter.

Table II below lists various of the microstructural properties of the polymers of Examples 6 and 7. These properties are the ratios of each of the (CH₃), (—CH═CH—), (—CH═CH₂) and

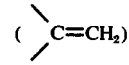

$$(\phantom{a}\!\!\!\!\diagdown\!\!\!\!\diagup C\!\!=\!\!CH_2)$$

groups which are present per 1000 carbon atoms in the polymers.

The results reported in Table I show that the catalysts employed in Examples 1–7 can be used to provide high yields of polymer. When used with hydrogen, as in Examples 1–5, the catalysts provide polymers having a broad range of melt index values as compared to the melt index values of the polymers made in Examples 6–7 without the use of hydrogen.

In all the examples disclosed herein the slurry of supported catalyst, in hexane, was added as such to the polymerization vessel.

TABLE I

POLYMERIZATION STUDIES WITH SUPPORTED BIS (INDENYL) - CHROMIUM

| Example | (C₉H₇)₂Cr, mg. | Support Act.temp. | H₂, psig | C₂H₄, psig. | Time Min. | Temp. ° C. | Yield g | MI dg/min | HLMI dg/min | FRR | Cyclohexane Extractables % | Density g/cc |
|---|---|---|---|---|---|---|---|---|---|---|---|---|
| 1 | 18 | 600 | 60  | 170 | 150 | 90  | 112 | 1.6  | 67  | 42  | —   | —     |
| 2 | 18 | 800 | 60  | 170 | 120 | 90  | 97  | 1.9  | 80  | 42  | —   | —     |
| 3 | 22 | 600 | 60  | 170 | 90  | 90  | 119 | 1.6  | 78  | 49  | 5.7 | —     |
| 4 | 22 | 600 | 100 | 170 | 90  | 90  | 177 | 13   | 424 | 32  | —   | —     |
| 5 | 22 | 600 | 150 | 200 | 120 | 90  | 148 | 50   | —   | —   | —   | —     |
| 6 | 22 | 600 | —   | 200 | 60  | 134 | 60  | 0.02 | 3.4 | —   | 17  | 0.953 |
| 7 | 22 | 600 | —   | 200 | 60  | 151 | 53  | 0.16 | 39  | 244 | 42  | —     |

TABLE II

MICROSTRUCTURE OF POLYETHYLENES PREPARED WITH SUPPORTED $(C_9H_7)_2$ Cr CATALYSTS

| Polymer of Example | $CH_3/1000C$ | [—CH=CH—]/1000C | [—CH=$CH_2$]/1000C | [>C=$CH_2$]/1000C |
|---|---|---|---|---|
| 6 | 5.8 | 1.0 | 0.87 | 0.05 |
| 7 | 9.0 | 1.9 | 1.7 | trace |

EXAMPLES 8 TO 13

A. Preparation of Catalyst

Six catalysts were prepared. Each catalyst was prepared by depositing 7.5, 15 or 30 milligrams of bis(indenyl)chromium II on 0.1, 0.2 or 0.4 grams of an activated silica support as described in Examples 1 to 7. The support had a surface area of about 300 square meters per gram and had been activated by being heated at 600° C for ≥ 18 hours. The amount of support and bis(indenyl) chromium II used for each catalyst is disclosed in Table III.

B. Productivity Studies With Supported Bis(Indenyl)Chromium

Each of the catalysts prepated above was used to homopolymerize ethylene for 1.5 to 5.0 hours at 90° C and at a pressure of 200 or 300 psig. The pressure was supplied by the ethylene feed. The polymerization reactions were conducted under slurry polymerization conditions in 500 ml of m-hexane.

Table III below also lists the polymerization time, in hours, and the psig of ethylene, which was employed in each polymerization reaction. Table III also lists, with respect to the resulting polymers, the yield, in grams and the parts per million of chromium metal residue in the polymers.

nyl)chromium II on 0.4 grams of an activated silica support as described in Examples 1 to 7. The support had a surface area of about 300 square meters per gram and had been activated by being heated at 600° C for ≥ 18 hours. The amount of bis(fluorenyl)chromium II used for each catalyst is disclosed below in Table IV.

B. Polymerization Reactions With Supported Bis(Fluorenyl)Chromium

Each of the catalysts prepared above was used to homopolymerize ethylene for 1.5 or 2.5 hours at a temperature of ≥ 90° C and at a pressure of ≥ 170 psig. The pressure was supplied by the ethylene feed, supplemented, in some cases, by a feed by hydrogen. The polymerization reactions were conducted in the solvent containing the catalyst, as prepared as disclosed above in paragraph A.

Table IV below also lists the psig of $H_2$(if any); the psig of ethylene; the polymerization time, in minutes; which was employed in each polymerization reaction. Table IV also lists, with respect to the resulting polymers, the yield, in grams; the melt index (MI), in decigrams per minute; the high load melt index (HLMI), in decigrams per minute; the melt flow ratio (FRR); and the weight % of extractables (18 hours in boiling cyclohexane).

Table V below lists various of the microstructural properties of the unextracted (virgin) polymer, and extracted polymer of Examples 14, 15, 17 and 18.

TABLE III

PRODUCTIVITY STUDIES WITH SUPPORTED BIS (INDENYL) CHROMIUM

| Example | $(C_9H_7)_2Cr$ mg | Silica gr | Reaction time hrs. | $C_2H_4$ psig | Polymer yield gr. | Chromium in polymer, ppm |
|---|---|---|---|---|---|---|
| 8 | 30 | 0.4 | 1.5 | 200 | 214 | 26 |
| 9 | 30 | 0.4 | 2.0 | 200 | 251 | 22 |
| 10 | 15 | 0.2 | 4.8 | 300 | 291 | 10 |
| 11 | 15 | 0.4 | 3.4 | 300 | 311 | 9 |
| 12 | 7.5 | 0.1 | 5.0 | 300 | 266 | 5 |
| 13 | 15 | 0.4 | 4.0 | 300 | 261 | 11 |

The results of Examples 8–13 as shown above in Table III demonstrate that the catalysts used in such examples can be employed over relatively long polymerization times to provide high yields of polymer that has a relatively low catalyst residue content.

EXAMPLES 14 TO 18

A. Preparation of Catalyst

Five catalysts were prepared. Each catalyst was prepared by depositing 25 or 30 milligrams of bis (fluore- These properties are the ratios of each of the ($Ch_3$), (—CH=CH—), (—CH=$CH_2$) and (—C=$CH_2$) groups which are present per 1000 carbon atoms in the polymers.

The results of Examples 14–18, particularly those disclosed in Table IV, demonstrate that the catalysts employed in such examples can be used to produce relatively high yields of polymer over relatively long polymerization times and that the catalysts can be used in the presence of hydrogen to provide polymers having a relatively broad range of melt index values.

TABLE IV

POLYMERIZATION STUDIES WITH SUPPORTED BIS (FLUORENYL) - CHROMIUM

| Exp. No. | $(C_{13}H_9)_2Cr$ mg | $H_2$ psig | $C_2H_4$ psig | Time, min | Yield g | MI, dg/min | HLMI, dg/min | FRR | Cyclohexane Extractables, % |
|---|---|---|---|---|---|---|---|---|---|
| 14 | 50 | 0 | 230 | 90 | 89 | NF | NF | — | 2.0 |
| 15 | 50 | 30 | 200 | 90 | 72 | 0.16 | 9.2 | 57 | — |
| 16 | 25 | 60 | 170 | 90 | 33 | 0.75 | 40 | 53 | — |
| 17 | 50 | 60 | 170 | 150 | 92 | 0.99 | 65 | 66 | 5.5 |
| 18 | 50 | 100 | 200 | 90 | 65 | 3.0 | 173 | 58 | — |

TABLE V

MICROSTRUCTURE OF POLYETHYLENES PREPARED WITH SUPPORTED $(C_{13}H_9)_2Cr$ CATALYSTS

| Polymer of Exp. | Before Extraction | | | After Extraction | | |
|---|---|---|---|---|---|---|
| | $CH_3$/ 1000C | —CH=CH— /1000C | —CH=CH$_2$ /1000C | $CH_3$/ 1000C | —CH=CH— /1000C | —CH=CH$_2$ /1000C |
| 14 | 4.0 | 0.15 | 0.92 | 0.28 | 0.05 | 0.10 |
| 15 | 2.8 | 0.30 | 0.67 | — | — | — |
| 17 | 5.0 | 0.20 | 1.2 | 1.6 | 0.05 | 0.05 |
| 18 | 5.4 | 0.15 | 0.88 | — | — | — |

EXAMPLES 19 TO 26

A. Preparation Of Catalyst

Eight catalysts were prepared. Each catalyst was prepared by depositing either 20 mg (0.071 millimoles) of bis(indenyl)chromium, $(C_9H_7)_2Cr$, or 10 mg (0.055 millimoles) of bis(cyclopentadienyl)chromium, $(C_5H_5)_2Cr$, on 0.4 grams of an activated silica support as described in Examples 1–7. Three different silica supports were used. Support I was an ID grade of silica which had a surface area of 300 m²/gram and an average pore diameter of 200 A. It had been activated by being heated at 800° C. for ≥ 18 hours. Support II was the same as Support I except that it had been activated at 600° C. for ≥ 18 hours. Support III was an ID grade of silica which had a surface area of 300 m²/gram and an average pore diameter of 160 A. It had been activated by being heated at 600° C. for ≥ 18 hours.

B. Thermal Treatment of Catalysts

After the catalysts were prepared as described above, some of them were subjected to a thermal treatment of 90°, 120° or 150° C., for 0.2, 1, 2 or 3 hours to simulate the use of the catalyst under elevated ethylene polymerization temperature conditions.

C. Polymerization Reactions

After the catalysts were prepared as described above in paragraphs A and B they were each used to homopolymerize ethylene at 90° C. for 0.5 or 1.0 hour at a pressure of 260 psi as supplied by ethylene at 200 psi and hydrogen at 60 psi. The polymerization reactions were conducted under slurry polymerization conditions in 500 ml of n-hexane.

Table VI below discloses with respect to each experiment the chromium compound and type of support used in each catalyst; the thermal aging treatment, if any, used for each supported chromium compound; the reaction time used and the yield of polymer.

TABLE VI

THERMAL AGING STUDIES

| Example | Chromium Compound | Support Type | Aging Treat., °C/hr | Reaction Time, hours | Yield of Polymer, grams |
|---|---|---|---|---|---|
| 19 | $(C_9H_7)_2Cr$ | I | none | 1.0 | 110 |
| 20 | $(C_9H_7)_2Cr$ | I | 90°/2 hr. | 1.0 | 125 |
| 21 | $(C_9H_7)_2Cr$ | I | 120°/3 hr. | 1.0 | 96 |
| 22 | $(C_9H_7)_2Cr$ | II | none | 1.0 | 136 |
| 23 | $(C_9H_7)_2Cr$ | II | 90°/3 hr. | 1.0 | 111 |
| 24 | $(C_5H_5)_2Cr$ | III | none | 0.5 | 96 |
| 25 | $(C_5H_5)_2Cr$ | III | 90°/1 hr. | 0.5 | 26 |
| 26 | $(C_5H_5)_2Cr$ | III | 150°/0.2 hr. | 0.5 | 10 |

The results of Examples 19 to 26 as disclosed in Table VI demonstrate that the catalyst systems of the present invention, i.e., those of Examples 19 to 23, are more thermally stable than those of Examples 24 to 26 which employ a different chromium compound therein. The catalysts of Examples 24 to 26 provide a marked decrease in yields, as compared to the catalysts of Examples 19 to 23, after a relatively long thermal history.

EXAMPLES 27 to 37

A. Preparation of Catalyst with Cyclopentadiene Compound

Eleven catalysts were prepared. Each catalyst was prepared by depositing either 20 mg (0.071 millimoles) of bis(indenyl)chromium, $(C_9H_7)_2Cr$, or 10 mg (0.055 millimoles) of bis(cyclopentadienyl)chromium, $(C_5H_5)_2Cr$, on 0.4 grams of fan activated silica support as described in Examples 1–7. Two different silica supports were used. Suppott IV was an ID grade of silica which had a surface area of 300 m²/gram and an average pore diameter of 200 A. It had been activated by being heated at 600° C. for ≥ 18 hours. Support V was an ID grade of silica which had a surface area of 300 m²/gram and an average pore diameter of 160 A. It had been activated by being heated at 600° C. for ≥ 18 hours. After the fused ring compound was placed on the support, various amounts of cyclopentadiene were added to the hexane slurry of the supported catalyst.

B. Polymerization Reactions

After the catalysts were prepared as described above they were each used to homopolymerize ethylene at 90° C. for 0.5 or 1.0 hour at a pressure of 200 psi of ethylene and under a hydrogen feed of either 30 or 60 psi. The polymerization reactions were conducted under slurry polymerization conditions in 500 ml of n-hexane.

Table VII below discloses, with respect to each experiment, the chromium compound, type of support and amount of cyclopentadiene (as a molar ratio of cyclopentadiene/Cr compound, Cp/Cr), if any, used with each catalyst; the reaction time and $H_2$ pressure used; and the yield and melt index (MI), in decigrams per minute, of the polymer produced.

The results of Examples 27 to 34 as disclosed in Table VII demonstrate the advantages of using a cyclopentadiene compound with the catalysts of the present invention for the purposes of providing polymers having a wide range of melt index values, whereas the results of Examples 35 to 37 demonstrate that a cyclopentadiene compound has little or no effect on the melt index properties of polymers made with the bis(cyclopentadienyl)chromium compound based catalyst.

EXAMPLES 38 to 46

A. Preparation of Catalysts

Nine catalysts were prepared. In each case the catalyst was prepared by depositing, as described in Examples 1-7, 18 mg of bis(indenyl)chromium on 0.4 grams of an activated silica support which was an ID grade of support having a surface area of 300 m²/gram and an average pore diameter of 200 A. The support was activated by heating at 600° C. for ≥ 18 hours.

B. Ethylene-Propylene Copolymerization Studies

After the catalysts were prepared as described above they were used to either homopolymerize ethylene, or to copolymerize ethylene with propylene. Each of the reactions was run at 89°–90° C. under slurry polymerization conditions in 500 ml of n-hexane.

Table VIII below discloses, with respect to each experiment, the amount of hydrogen and ethylene used (in psi of the pressure of the gas feed); the amount of propylene used, if any (in grams and in psi of the pressure of the gas feed); the reaction time, in minutes; and the yield, in grams; melt index, in decigrams per minute, melt flow ratio and density, in grams/cc, of each polymer produced. The melt index results are reported for normal load test conditions (IP) and for 10 times normal load test conditions (10P).

Table IX below discloses the unsaturated properties of the polymers made in Examples 39–44 and the % by weight of propylene in the copolymers of Examples 41–44.

TABLE VII

EFFECT OF CYCLOPENTADIENE ADDITION TO SUPPORTED BIS(INDENYL)-CHROMIUM

| Example | Chromium Compound | Support type | Cp/Cr ratio | Reaction Time, hrs. | $H_2$, psi | Yield, grams | MI, dg/min |
|---|---|---|---|---|---|---|---|
| 27 | $(C_9H_7)_2Cr$ | IV | 0 | 1.0 | 60 | 110 | 0.19 |
| 28 | $(C_9H_7)_2Cr$ | IV | 0 | 1.0 | 60 | 153 | 0.32 |
| 29 | $(C_9H_7)_2Cr$ | IV | 0 | 1.0 | 60 | 136 | 0.62 |
| 30 | $(C_9H_7)_2Cr$ | IV | 0 | 1.0 | 60 | 137 | 0.62 |
| 31 | $(C_9H_7)_2Cr$ | IV | 0.25 | 1.0 | 60 | 151 | 2.1 |
| 32 | $(C_9H_7)_2Cr$ | IV | 0.50 | 1.0 | 60 | 123 | 6.1 |
| 33 | $(C_9H_7)_2Cr$ | IV | 1.0 | 1.0 | 60 | 85 | 19 |
| 34 | $(C_9H_7)_2Cr$ | IV | 10 | 1.0 | 60 | 28 | 9.6 |
| 35 | $(C_5H_5)_2Cr$ | V | 0 | 0.5 | 30 | 96 | 1.6 |
| 36 | $(C_5H_5)_2Cr$ | V | 2.2 | 0.5 | 30 | 90 | 2.0 |
| 37 | $(C_5H_5)_2Cr$ | V | 22 | 0.5 | 30 | 38 | 1.9 |

TABLE VIII

Ethylene-Propylene Copolymerization Studies With Supported Bis(Indenyl)Chromium Catalysts

| Example | $H_2$, psi | $C_2H_4$, psi | $C_3H_6$ grams | $C_3H_6$ psi | Reaction Time, minutes | Yield, grams | Melt Index 1P | Melt Index 10P | Flow Rate Ratio | Density g/cc |
|---|---|---|---|---|---|---|---|---|---|---|
| 38 | 30 | 200 | — | — | 60 | 149 | — | 29 | — | — |
| 39 | 40 | 160 | — | — | 60 | 83 | 0.52 | 19 | 37 | 0.962 |
| 40 | 40 | 160 | — | — | 90 | 93 | 0.58 | 27 | 47 | 0.961 |
| 41 | 30 | 200 | 34 | 80 | 30 | 58 | 0.08 | 7 | — | — |
| 42 | 30 | 200 | 62 | 115 | 60 | 68 | 1.8 | 88 | 49 | 0.933 |
| 43 | 30 | 200 | 74 | 145 | 60 | 109 | 0.24 | 14 | 58 | 0.933 |
| 44 | 30 | 110 | 28 | 60 | 90 | 70 | 5.7 | 243 | 43 | 0.940 |
| 45 | 40 | 90 | 32 | 70 | 120 | 39 | 85 | — | — | 0.936 |
| 46 | 40 | 95 | 31 | 65 | 60 | 38 | 55 | — | — | 0.939 |

TABLE IX

| Example | Density g/cc | propylene content Wt. % | vinyl content [—CH=CH₂]/1000C | pendant methylene content [>C=CH₂]/1000C | trans content [—CH=CH—]/1000C |
|---|---|---|---|---|---|
| 39 | 0.962 | (0.30)* | 0.5 | 0.02 | 0.1 |
| 40 | 0.961 | (0.23)* | 0.6 | 0.2 | 0.1 |
| 41 | 0.937 | 2.4 | 0.2 | 0.2 | 0.1 |
| 42 | 0.933 | 3.9 | 0.3 | 0.4 | 0.2 |
| 43 | 0.933 | 3.7 | 0.2 | 0.3 | 0.2 |
| 44 | 0.940 | 3.6 | 0.2 | 0.3 | 0.2 |

*methyl content (pendant or terminal)

The results of Examples 38 to 46 as disclosed in Tables VIII and IX disclose that the catalysts of the present invention can be used to make a range of homo-and co- polymer products having a wide range of melt index and density properties, and in good yields.

EXAMPLES 47 to 51

A. Preparation of Catalysts

Five catalysts were prepared. In each case the catalyst was prepared by depositing, as described in Examples 1–7, 10 mg of bis(indenyl)chromium on 0.4 grams of the activated support of Examples 38 to 46.

B. Effect of Polymerization Temperature

After the catalysts were prepared as described above, they were each used to homopolymerize ethylene for 0.5 or 1.0 hour at various temperatures under a pressure of 200 psi of ethylene and 60 psi of H₂.

Table X below discloses, with respect to each experiment, the reaction temperature and time, and the yield and melt index of the resulting polymers.

EXAMPLES 52 to 56

A. Preparation of Catalysts

Five catalysts were prepared. In each case the catalyst was prepared by depositing, as disclosed in Examples 1 to 7, 11.9 or 23.8 mg of bis(9-methyl-fluorenyl) chromium, $(C_{14}H_{11})_2Cr$, on 0.4 grams of the activated support of Examples 38 to 46.

B. Polymerization Reactions

After the catalysts were prepared as described above, they were each used to homopolymerize ethylene for 1 or 2 hours at 90° C. under slurry polymerization conditions in 500 ml of n-hexane.

Table XI below discloses, with respect to each experiment, the amount of chromium compound used; the amount of ethylene and hydrogen, if any, used (in psi of the pressure of the gas feed); the reaction time in hours; and the following properties of the polymers produced; yield, in grams; melt index (MI) in decigrams/gram; high load melt index (HLMI), in decigrams/gram; melt flow ratio (MFR); % cyclohexane extractables and density, in grams per cc.

TABLE XI

| Example | $(C_{14}H_{11})_2Cr$, mg | H₂, psi | C₂H₄, psi | React. time, hrs. | Yield, grams | MI dg/min | HLMI dg/min | MFR | Cyclohexane Extractables % | Density |
|---|---|---|---|---|---|---|---|---|---|---|
| 52 | 11.9 | 0 | 200 | 2 | 34 | — | — | — | — | — |
| 53 | 23.8 | 0 | 200 | 2 | 105 | — | — | — | 1.56 | 0.9320 |
| 54 | 23.8 | 20 | 180 | 2 | 99 | NF | NF | — | 1.52 | 0.9318 |
| 55 | 23.8 | 60 | 210 | 1 | 40 | NF | 0.24 | — | 2.29 | 0.9550 |
| 56 | 23.8 | 100 | 180 | 2 | 90 | 0.03 | 1.38 | 46 | — | — |

NF = no flow, 0.0 melt index

TABLE X

| Example | Reaction Temp., °C | Reaction Time, hours | Yield, grams | Melt Index, dg/min. |
|---|---|---|---|---|
| 47 | 49 | 1.0 | 39 | 0.01 |
| 48 | 60 | 1.0 | 55 | 0.02 |
| 49 | 75 | 1.0 | 60 | 0.06 |
| 50 | 90 | 1.0 | 79 | 0.35 |
| 51 | 120 | 0.5 | 43 | 5.5 |

The results of Examples 47 to 51 as disclosed in Table X disclose that the catalysts of the present invention can be used to make polymers having a broad range of melt index properties and in relatively high yields over a broad range of polymerization temperatures.

The results of Examples 52 to 56 as disclosed in Table XI disclose that the catalysts of the present invention are responsive to hydrogen and produce polymers, in good yields, which have a range of melt index and density properties.

The supports used in the Examples which had a pore diameter of 160 A, had a pore volume of 1.2 cc/gm, and the supports which had a pore diameter of 200 A, had a pore volume of 1.65 cc/gm.

What is claimed is:

1. An olefin polymerization catalyst which comprises, supported on activated inorganic oxide, organochromium compound of the structure Ar—Cr II — Ar' wherein Ar and Ar' are the same or different and are indenyl or fluorenyl radicals which are unsubstituted or substituted with $C_1$ to $C_{10}$, inclusive hydrocarbon radicals.

2. An olefin polymerization catalyst as in claim 1 in which the support has a surface area of about 50 to 1000 square meters per gram and is selected from the group consisting of silica, alumina and silica-alumina.

3. An olefin polymerization catalyst as in claim 2 which comprises 0.001 to 25% by weight of organochromium compound based on the combined weight of the support and the organochromium compound.

4. An olefin polymerization catalyst as in claim 3 in which the indenyl and fluorenyl radicals are unsubstituted.

5. An olefin polymerization catalyst as in claim 4 in which the organochromium compound comprises bis(indenyl)chromium [II].

6. An olefin polymerization catalyst as in claim 4 in which the organochromium compound comprises bis(fluorenyl)chromium [II].

7. An olefin polymerization catalyst as in claim 1 which has been treated with about 0.05 to 10 mols of cyclopentadiene compound per mol of organochromium compound in said catalyst.

8. An olefin polymerization catalyst as in claim 4 which has been treated with about 0.05 to 10 mols of cyclopentadiene compound per mol of organochromium compound in said catalyst.

9. An olefin polymerization catalyst as in claim 7 in which said cyclopentadiene compound is cyclopentadiene.

10. An olefin polymerization catalyst as in claim 8 in which said cyclopentadiene compound is cyclopentadiene.

11. A process for polymerizing a monomer charge comprising ethylene by contacting said charge with a catalyst which comprises organochromium compound of the structure Ar—Cr II — Ar' wherein Ar and Ar' are the same or different and are indenyl or fluorenyl radicals which are unsubstituted or substituted with $C_1$ to $C_{10}$, inclusive, hydrocarbon radicals supported on activated inorganic oxide.

12. A process as in claim 11 in which said monomer charge consists of ethylene.

13. A process as in claim 11 in which said monomer charge comprises ethylene and at least one $C_3$ to $C_{12}$ alpha-olefin.

14. A process as in claim 13 in which said $C_3$ to $C_{12}$ alpha-olefin comprises propylene.

15. A process as in claim 11 which is conducted in a solvent.

16. A process as in claim 11 in which said support has a surface area of about 50 to 1000 square meters per gram and is selected from the group consisting of silica, alumina and silica-alumina.

17. A process as in claim 16 in which said catalyst comprises 0.001 to 25% by weight of organochromium compound based on the combined weight of the support and the organochromium compound.

18. A process as in claim 17 in which the indenyl and fluorenyl radicals are unsubstituted.

19. A process as in claim 18 in which the organochromium compound comprises bis(indenyl) chromium [II].

20. A process as in claim 19 in which the organochromium compound comprises bis(fluorenyl) chromium [II].

21. A process as in claim 11 which is conducted in the presence of about 0.001 to 10 moles of hydrogen per mole of olefin monomer.

22. A process as in claim 21 in which said catalyst has been treated with about 0.05 to 10 moles of cyclopentadiene compound per mole of organochromium compound in said catalyst.

23. A process as in claim 22 in which said cyclopentadiene compound is cyclopentadiene.

* * * * *

UNITED STATES PATENT OFFICE
CERTIFICATE OF CORRECTION

Patent No. 4,015,059  Dated March 29, 1977

Inventor(s) Fredrick J. Karol

It is certified that error appears in the above-identified patent and that said Letters Patent are hereby corrected as shown below:

Column 1, line 35, change "(indenyl-" to --(indenyl)- --.

Column 3, line 42, "of typoes" should read --or types--.

Column 4, line 13, "fins" should read --fin--.

Column 6, line 47, change "catalyst" to --catalyst composition--.

Column 9, line 28, change "prepated" to --prepared--.

Column 10, line 57, change "(Ch$_3$)" to --(CH$_3$)--.

Column 12, line 61, change "fan" to --an--.

Column 14, Table VIII, Example 38, "29" should read --2.9--.

Column 16, line 65, ", inclusive" should read --, inclusive,--.

Signed and Sealed this fifth Day of July 1977

[SEAL]

Attest:

RUTH C. MASON  
Attesting Officer

C. MARSHALL DANN  
Commissioner of Patents and Trademarks